US012618762B2

(12) United States Patent
He et al.

(10) Patent No.: US 12,618,762 B2
(45) Date of Patent: May 5, 2026

(54) FORCED OXIDATION TEST SYSTEM

(71) Applicant: China Resources Snow Breweries Company Ltd, Beijing (CN)

(72) Inventors: Lidong He, Beijing (CN); Yueqin Liu, Beijing (CN); Tao Wang, Beijing (CN); Zhi Li, Beijing (CN); Junhui Zhong, Beijing (CN); Jianhua Jia, Beijing (CN); Zhihao Li, Beijing (CN); Bo Zheng, Beijing (CN); Biao Jin, Beijing (CN)

(73) Assignee: CHINA RESOURCES SNOW BREWERIES COMPANY LTD, Beijing (CN)

( * ) Notice: Subject to any disclaimer, the term of this patent is extended or adjusted under 35 U.S.C. 154(b) by 368 days.

(21) Appl. No.: 18/507,636

(22) Filed: Nov. 13, 2023

(65) Prior Publication Data

US 2024/0337573 A1     Oct. 10, 2024

(30) Foreign Application Priority Data

Apr. 4, 2023     (CN) .......................... 202310356694.1

(51) Int. Cl.
    *G01N 13/00*          (2006.01)
(52) U.S. Cl.
    CPC ....... *G01N 13/00* (2013.01); *G01N 2013/003* (2013.01)
(58) Field of Classification Search
    CPC ............. G01N 13/00; G01N 2013/003; G01N 17/002; G01N 31/00; B65G 47/90;
    (Continued)

(56) References Cited

U.S. PATENT DOCUMENTS 6,892,567 B1 * 5/2005 Morrow ................ G01M 3/227
                                                    73/38
6,964,191 B1 * 11/2005 Tata ..................... G01N 15/082
                                                    73/49.3
(Continued)

FOREIGN PATENT DOCUMENTS

CN          107894795 A  *  4/2018  ............. G05D 23/20
CN          108020495 A  *  5/2018  ......... G01N 15/0826
(Continued)

OTHER PUBLICATIONS

CN-108020495-A (Year: 2018).*
(Continued)

*Primary Examiner* — Fatemeh Esfandiari Nia
(74) *Attorney, Agent, or Firm* — HSML P.C.

(57) ABSTRACT

The present disclosure relates to a forced oxidation test system, including: forced oxidation subsystems, a first cabinet, a second cabinet, and connecting devices. Inner cavities of adjacent forced oxidation subsystems are arranged in parallel. The forced oxidation subsystems include: forced oxidation portions, inner cavities of adjacent forced oxidation portions being arranged in series. To-be-tested packages are placed on the first cabinet. The second cabinet is connected to the first cabinet through the connecting devices. The forced oxidation subsystems are arranged opposite to the to-be-tested packages. The second cabinet is configured to move along an axis of the connecting devices towards a direction adjacent to the to-be-tested packages until the inner cavities of the forced oxidation portions are sealed and mounted on the to-be-tested packages, such that a replacement gas in the inner cavities of the forced oxidation portions is permeated into the to-be-tested packages.

9 Claims, 5 Drawing Sheets

(58) Field of Classification Search
      CPC .......... B65G 2201/0244; B25J 15/0052; B25J
                                      15/10; B65B 21/18
      See application file for complete search history.

(56)                    References Cited

U.S. PATENT DOCUMENTS

| | | | |
|---|---|---|---|
| 2004/0007072 A1* | 1/2004 | Davis ................. | G01N 15/0826 |
| | | | 73/701 |
| 2004/0040372 A1 | 3/2004 | Plester et al. | |
| 2011/0244577 A1 | 10/2011 | Shimoda et al. | |
| 2020/0086500 A1* | 3/2020 | Papen .................. | B65G 47/905 |
| 2025/0128889 A1* | 4/2025 | Johannisson ........ | B65G 47/901 |

FOREIGN PATENT DOCUMENTS

| | | | |
|---|---|---|---|
| CN | 214058762 U | * | 8/2021 |
| CN | 214668480 U | | 11/2021 |
| CN | 113977052 A | | 1/2022 |
| CN | 219695033 U | | 9/2023 |
| DE | 102004047427 A1 | | 4/2006 |
| JP | 2007085807 A | | 4/2007 |
| JP | 2018112509 A | | 7/2018 |
| WO | 0028300 A1 | | 5/2000 |

OTHER PUBLICATIONS

CN-214058762-U (Year: 2021).*
CN-107894795-A (Year: 2018).*
First Office Action issued for Chinese Patent Application No.
202310356694.1, dated May 15, 2025, 24 pages including English
machine translation.

\* cited by examiner

FORCED OXIDATION TEST SYSTEM

CROSS-REFERENCE TO RELATED APPLICATIONS

This application claims priority to Chinese patent application No. 2023103566941, filed on Apr. 4, 2023, the entire content of which is incorporated herein by reference in its entirety.

TECHNICAL FIELD

The present disclosure relates to the field of packaging test technologies, and in particular, to a forced oxidation test system.

BACKGROUND

With the development of a packaging technology and the in-depth research on oxygen barrier properties of packaging, a current evaluation method for an overall shelf life of a product is mainly to use an environmental test chamber to conduct photothermal treatment on samples, but according to an existing direct treatment test method, only a photothermal condition can be controlled and an oxygen penetration amount cannot be controlled. As a result, a final test result differs from an actual shelf life.

For example, according to test data of thin-film oxygen permeability, a 1 mm thick 25 cm$^2$ low-density PE material has permeability of about 39.996 ml/(m$^2$·d) at 20° C., 80% RH, and 20% O$_2$, has permeability of about 52.953 ml/(m$^2$·d) at 30° C., 80% RH, and 20% O$_2$, and has permeability of about 68.862 ml/(m$^2$·d) at 40° C., 80% RH, and 20% O$_2$. According to Van't Hoff's chemical reaction rules, each time a reaction temperature increases by 10 K, a reaction rate thereof becomes 2 to 4 times the original rate. Obviously, in a case where quantitative introduction of oxygen is not forced, direct treatment and study of product shelf life have obvious limitations.

SUMMARY

Accordingly, it is necessary to provide a forced oxidation test system to provide stable pretreated samples with different oxygen penetration degrees for shelf life simulation tests.

The present disclosure provides a forced oxidation test system, including:

a plurality of forced oxidation subsystems, inner cavities of adjacent forced oxidation subsystems being arranged in parallel, the plurality of forced oxidation subsystems comprising a plurality of forced oxidation portions, inner cavities of adjacent forced oxidation portions being arranged in series;

a first cabinet, a to-be-tested package being placed on the first cabinet; and a second cabinet connected to the first cabinet through a connecting device, the plurality of forced oxidation subsystems being mounted on the second cabinet, and the forced oxidation portion being arranged opposite to the to-be-tested package, wherein the second cabinet is configured to move along an axis of the connecting devices in a direction adjacent to the to-be-tested package until the inner cavity of the forced oxidation portion is sealedly mounted on the to-be-tested package, such that a replacement gas in the inner cavity of the forced oxidation portions is permeated into the to-be-tested package.

In one of the embodiments, each of the forced oxidation portions includes:

a seat body provided with a seat body inner cavity along a first direction, the seat body inner cavity being provided with a mounting port, wherein the first direction is configured as a mounting direction of the to-be-tested package;

a sealing assembly arranged in the seat body inner cavity and located at an end of the seat body inner cavity adjacent to the mounting port, the sealing assembly being sleeved between the to-be-tested package and the seat body inner cavity, a replacement subcavity being formed in the seat body inner cavity; and a gas replacement assembly in communication with the replacement subcavity, the gas replacement assembly being configured to feed the replacement gas into the replacement subcavity through a ventilation joint.

In one of the embodiments, each of the forced oxidation portions further includes:

a replacement sensing member configured to acquire temperatures and/or pressures in the plurality of mutually communicated replacement subcavities in the same forced oxidation subsystem, the replacement sensing member being mounted on the seat body of any one and/or two of the forced oxidation portions in the same forced oxidation subsystem, and the replacement sensing member being in communication with the replacement subcavity.

In one of the embodiments, the sealing assembly includes:

a sealing member configured to adjust sealing between the to-be-tested package and the seat body inner cavity through a volume change of the sealing member;

a sealing intake joint connected to the seat body; and a sealing inflation needle, a first end of the sealing inflation needle being in communication with the sealing member, and a second end of the sealing inflation needle being connected to a first end of the sealing intake joint, a fastening air source being fed into the sealing member by the sealing intake joint through the sealing inflation needle.

In one of the embodiments, the gas replacement assembly includes:

a replacement intake joint arranged on a first side of the seat body, the replacement intake joint being in communication with the replacement subcavity, wherein the replacement gas is fed into the replacement subcavity by the replacement intake joint; and a replacement outlet joint arranged on a second side of the seat body opposite to the first side, and the replacement outlet joint being in communication with the replacement subcavity.

In one of the embodiments, each of the forced oxidation subsystems further includes:

a temperature regulating portion mounted at an input end of the replacement intake joint, the temperature regulating portion being configured to regulate a temperature of the replacement gas entering the inner cavity of the forced oxidation portion; the temperature regulating portion including:

a heater mounted on a coil bracket;

an intake coil, the intake coil being spirally mounted on the heater, a first end of the intake coil being connected to the input end of the replacement intake joint, the replacement gas being fed from the other end of the intake coil;

a dryer mounted at an end of the intake coil adjacent to a second end of the intake coil; and a temperature sensor connected to the intake coil.

In one of the embodiments, each of the forced oxidation subsystems further includes:

a pressure regulating portion configured to regulate a pressure of the replacement gas entering the inner cavity of the forced oxidation portion, the pressure adjustment portion comprising:

an intake regulating valve connected to the replacement intake joint through an air pipe; and an exhaust regulating valve connected to the replacement outlet joint through the air pipe.

In one of the embodiments, the first cabinet is provided with a positioning groove, and the to-be-tested package is placed in the positioning groove.

In one of the embodiments, a ventilation hole is provided at a bottom of the positioning groove.

In one of the embodiments, the connecting device includes:

a drive motor mounted in the first cabinet;

a synchronous transmission shaft connected to an output end of the drive motor; and a telescopic rod, a first end of a fixed section of the telescopic rod being connected to the first cabinet, a second end of the fixed section of the telescopic rod being connected to a first end of a movable section of the telescopic rod, and a second end of the movable section of the telescopic rod being connected to the second cabinet, the synchronous transmission shaft being connected to the second end of the fixed section of the telescopic rod or the first end of the movable section of the telescopic rod.

According to the forced oxidation test system provided in the present disclosure, gas replacement is conducted through the forced oxidation portion, such that the replacement gas can be permeated into the to-be-tested package with an accelerated rate, and each forced oxidation subsystem can provide stable to-be-tested packages with different oxygen permeability degrees for shelf life simulation tests.

REFERENCE SIGNS

Figure 1:
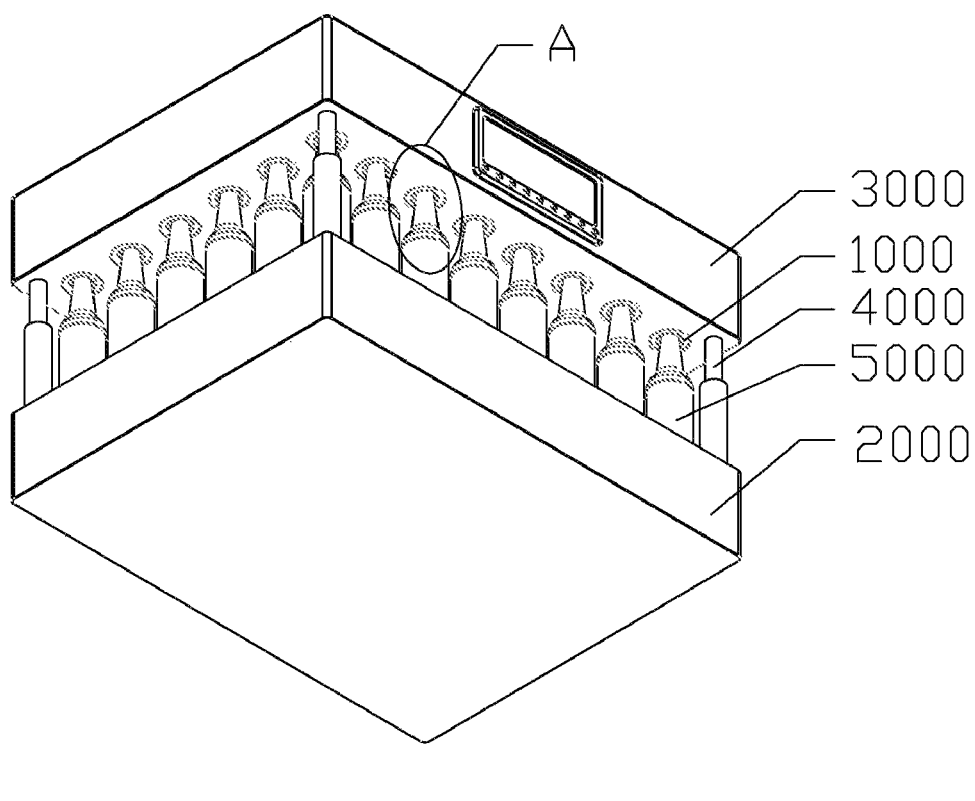
FIG. 1 is a schematic structural view of a forced oxidation test system according to an embodiment of the present disclosure.

1000: forced oxidation subsystem;
1100: forced oxidation portion;
1110: seat body;
1120: seat body inner cavity;
1130: sealing assembly;
1131: sealing member;
1132: sealing intake joint;

4

1133: sealing inflation needle;
1140: gas replacement assembly;
1141: replacement intake joint;
1142: replacement outlet joint;
1150: temperature regulating portion;
1151: heater;
1152: intake coil;
1153: dryer;
1154: coil bracket;
1160: pressure regulating portion;
1161: intake regulating valve;
1162: exhaust regulating valve;
1170: replacement sensing member;
2000: first cabinet;
3000: second cabinet;
4000: connecting device;
5000: to-be-tested package.

DETAILED DESCRIPTION OF THE EMBODIMENTS

In order to make the above objectives, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by specific embodiments disclosed below.

In the description of the present disclosure, it should be understood that the orientation or position relationships indicated by the terms "central", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", etc. are based on the orientation or position relationships shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance or implicitly specifying the number of the indicated technical features. Thus, the features defined with "first" and "second" may explicitly or implicitly include at least one feature. In the description of the present disclosure, "a plurality of" means at least two, such as two or three, unless specifically stated otherwise.

In the present disclosure, unless otherwise specifically stated and limited, the terms "install," "join," "connect", "fix", etc. should be understood in a broad sense, such as, a fixed connection, a detachable connection, or an integral connection; a mechanical connection, or an electrical connection; a direct connection, an indirect connection through an intermediate medium, internal communication between two elements, or interaction between two elements, unless otherwise expressly defined. For those of ordinary skill in the art, the specific meanings of the foregoing terms in the present invention can be understood on a case-by-case basis.

In the present disclosure, unless otherwise explicitly specified and defined, a first feature being "on" or "under" a second feature may be a case that the first feature is in direct contact with the second feature, or the first feature is in indirect contact with the second feature via an intermediate medium. Furthermore, the first feature being "over", "above" and "on top of" the second feature may be a case that the first feature is directly above or obliquely above the second feature, or only means that the level of the first feature is higher than that of the second feature. The first feature being "below", "underneath" or "under" the second feature may be a case that the first feature is directly underneath or obliquely underneath the second feature, or only means that the level of the first feature is lower than that of the second feature.

It should be noted that when one element is referred to as "fixed to" or "arranged on" another element, it may be directly disposed on another element or an intermediate element may exist. When one element is considered to be "connected to" another element, it may be directly connected to another element or an intermediate element may co-exist. The terms "vertical", "horizontal", "up", "down", "left", "right" and similar expressions used herein are for illustrative purposes only, and do not represent unique embodiments.

Prior to formal introduction to the present disclosure, a brief introduction to the shelf life involved in background is given as follows.

The shelf life refers to a period of time during which food is stored under a recommended condition to remain safe, to ensure desirable organoleptic, physicochemical, and microbiological properties, and to retain any nutritional value declared on a label. The shelf life generally refers to a period during which quality of the food is maintained under a condition specified on the label. During this period, the food is completely suitable for sale and meets the quality specified on the label or in a product standard. Beyond this period, the food is still edible for a certain period of time. Generally, the shelf life of the food depends on four factors: a formula, a processing technology, packaging, and a storage condition. A change in any of these may affect the shelf life of the product, either positively or negatively. The shelf life is generally related to factors such as microbial control, color stability, yeast and mold inhibition, taste stability, texture stability, and aroma stability.

Prior to the formal introduction to the present disclosure, a first direction and a second direction involved in the present disclosure are firstly described as follows. The first direction is configured as a mounting direction between a to-be-tested package and a forced oxidation test device. The first direction as used herein may be any one of up, down, left, and right directions, which is not specifically limited.

Figure 2:
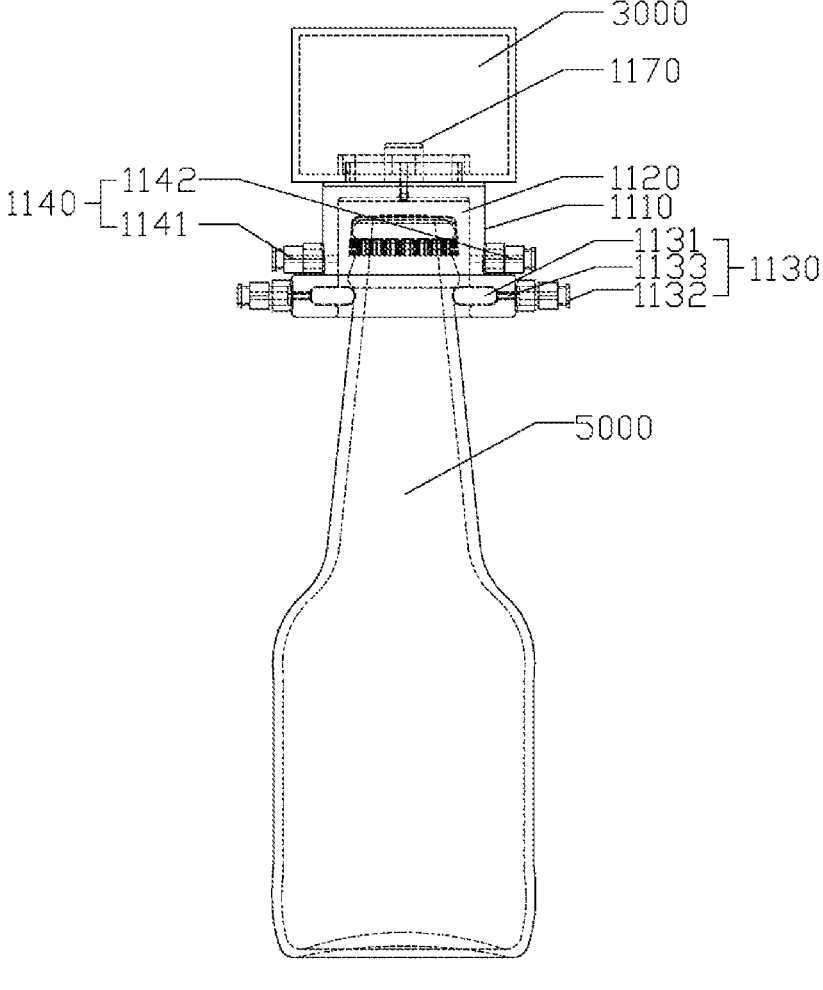
FIG. 2 is a schematic enlarged view of a portion A in FIG. 1.
Figure 3:
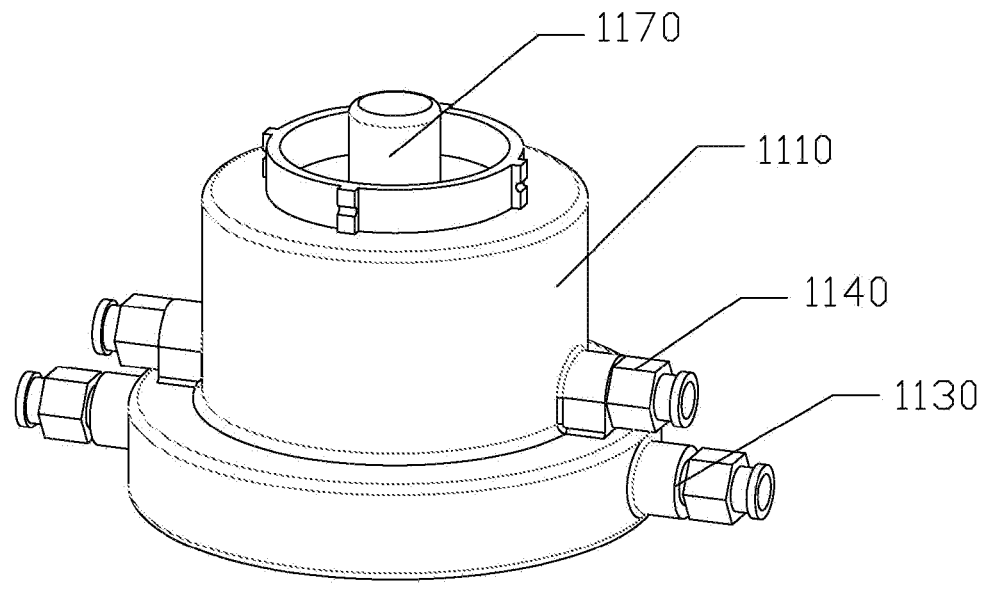
FIG. 3 is a schematic structural view of a forced oxidation portion in FIG. 2.
Figure 4:
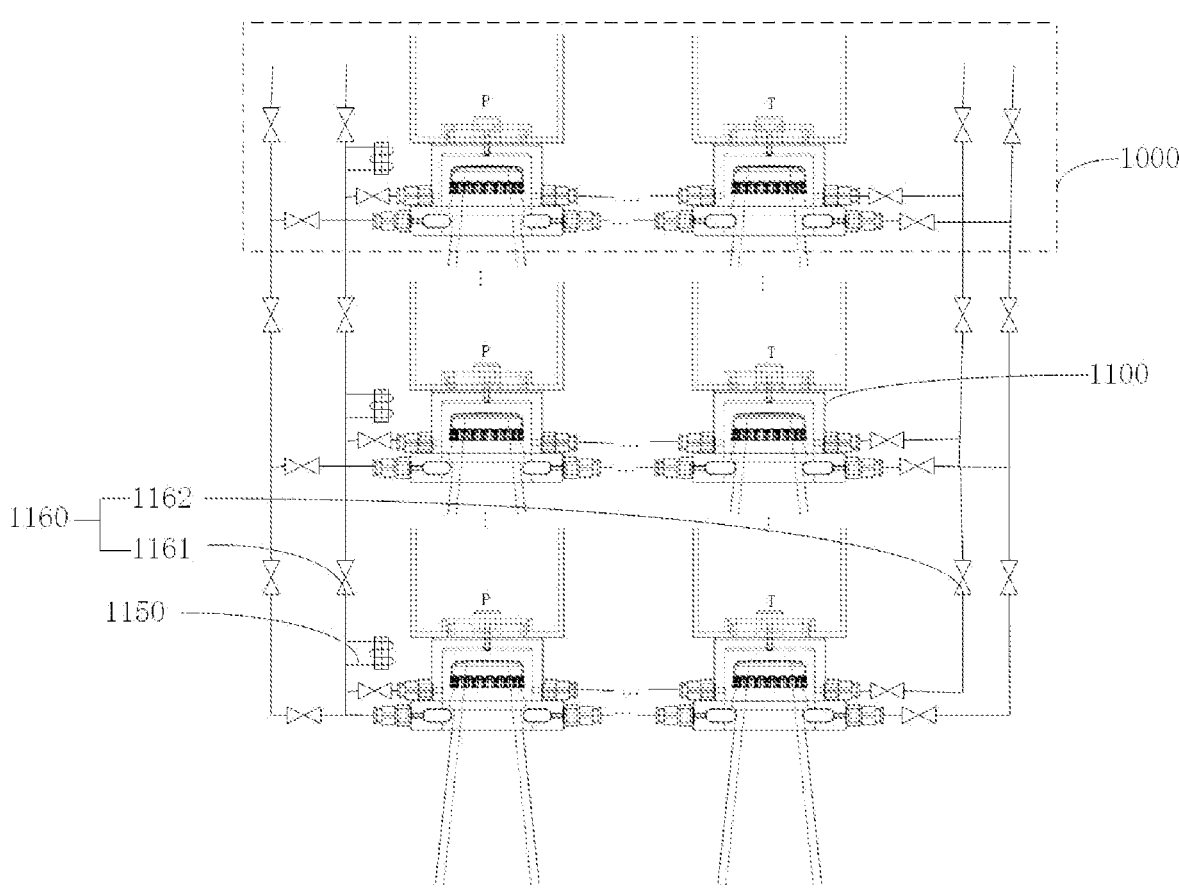
FIG. 4 is a schematic view of an operating principle of a forced oxidation subsystem in FIG. 1.
Figure 5:
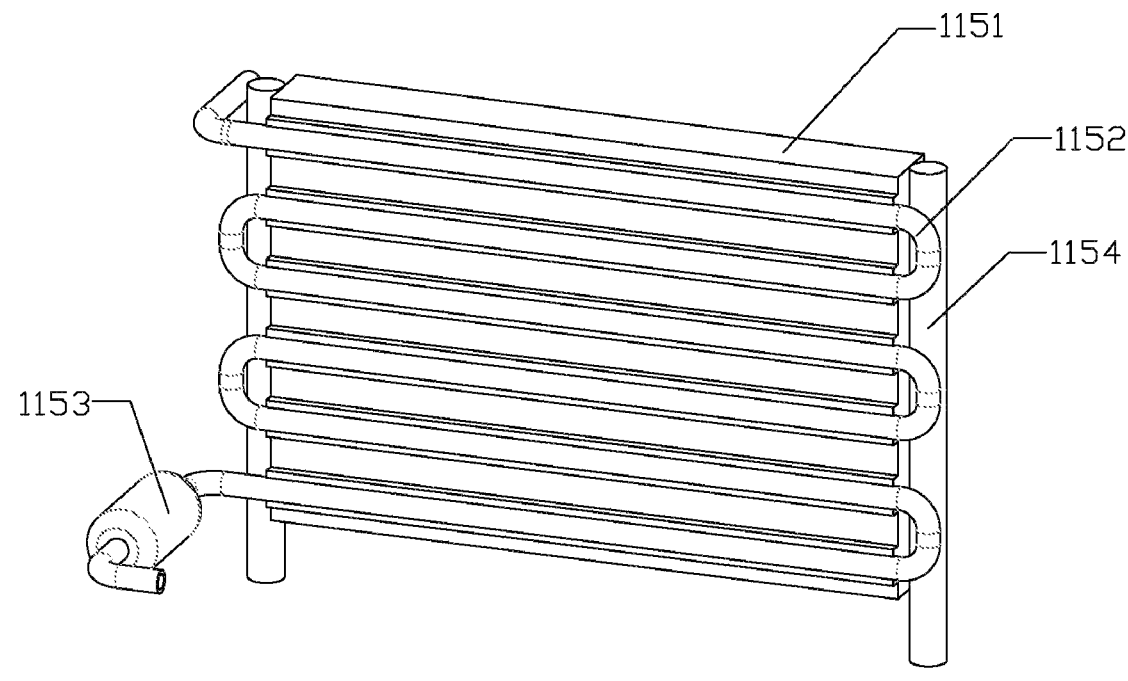
FIG. 5 is a schematic structural view of a temperature regulating portion.

Referring to FIG. 1 to FIG. 5, FIG. 1 is a schematic structural view of a forced oxidation test system according to an embodiment of the present disclosure, FIG. 2 is a schematic enlarged view of a portion A in FIG. 1, FIG. 3 is a schematic structural view of a forced oxidation portion in FIG. 2, FIG. 4 is a schematic view of an operating principle of a forced oxidation subsystem in FIG. 1, and FIG. 5 is a schematic structural view of a temperature regulating portion.

A forced oxidation test system provided in an embodiment of the present disclosure includes: a plurality of forced oxidation subsystems 1000, a first cabinet 2000, a second cabinet 3000, and connecting devices 4000. Inner cavities of adjacent forced oxidation subsystems 1000 are arranged in parallel. The plurality of forced oxidation subsystems 1000 include a plurality of forced oxidation portions 1100, and inner cavities of adjacent forced oxidation portions 1100 are arranged in series. A plurality of to-be-tested packages 5000 (such as bottled packages or canned packages) are placed on the first cabinet 2000. The second cabinet 3000 is connected to the first cabinet 2000 through the connecting devices 4000. The forced oxidation subsystems 1000 are mounted on the second cabinet 3000, and the forced oxidation portions 1100 are arranged opposite to the to-be-tested packages 5000. The second cabinet 3000 is configured to move along an axis of the connecting devices 4000 in a direction adjacent to the to-be-tested packages 5000 until the inner cavities of the forced oxidation portions 1100 are sealedly mounted on the to-be-tested packages 5000, such that a replacement gas in the inner cavities of the forced oxidation portions 1100 is permeated into the to-be-tested packages 5000. In the present disclosure, each forced oxidation subsystem 1000 can provide stable to-be-tested packages 5000 with different oxygen permeability degrees for shelf life simulation tests.

The replacement gas involved in the present disclosure may be oxygen, air, or the like, which may be adjusted according to the test requirement and will not be listed herein. Generally, the forced oxidation subsystem 1000 may include 2 to 6 forced oxidation portions 1100 connected in series. When a forced oxidation pretreatment condition of the to-be-tested package 5000 has no control requirements for different conditions, the forced oxidation portions 1100 involved in the forced oxidation test system may all be connected in series. In other words, only one forced oxidation subsystem 1000 is arranged, which can reduce the number of arranged sensing devices and reduce a manufacturing cost of the forced oxidation test system.

It should to be noted that the forced oxidation portions 1100 may be arranged in an array as shown in the figures, but is not limited thereto.

In an embodiment of the present disclosure, the forced oxidation portion 1100 includes: a seat body 1110, a sealing assembly 1130, a gas replacement assembly 1140, and a replacement sensing member 1170. The seat body 1110 is provided with a seat body inner cavity 1120 along the first direction, and the seat body inner cavity 1120 is provided with a mounting port. The first direction is configured as a mounting direction of the to-be-tested package 5000. The sealing assembly 1130 is arranged in the seat body inner cavity 1120 and is located at an end thereof adjacent to the mounting port. The sealing assembly 1130 is sleeved between the to-be-tested package 5000 and the seat body inner cavity 1120. A replacement subcavity is formed in the seat body inner cavity 1120. The gas replacement assembly 1140 is in communication with the replacement subcavity, and the gas replacement assembly 1140 is configured to feed the replacement gas into the replacement subcavity through a ventilation joint.

In an embodiment of the present disclosure, the forced oxidation portion 1100 further includes a replacement sensing member 1170. In the same forced oxidation test system 1000, since the replacement subcavities of each forced oxidation portion 1100 are in communication with each other, gas conditions in the corresponding cavities are relatively stable and uniform. In this case, at least one replacement sensing member 1170 may generally be configured to acquire temperatures and/or pressures in the plurality of mutually communicated replacement subcavities. The replacement sensing member 1170 is mounted on the seat body 1110 of any one and/or two of the forced oxidation portions 1100 in the same forced oxidation subsystem 1000, and the replacement sensing member 1170 is in communication with the replacement subcavity. In different forced oxidation test systems 1000, at least one replacement sensing member 1170 may be selected to acquire temperatures and/or pressures in the plurality of mutually communicated replacement subcavities in each forced oxidation test system 1000.

Optionally, the replacement sensing member 1170 may be selected as a temperature sensing member. In the same forced oxidation test system 1000, the temperature sensing member is configured to acquire the temperatures in the plurality of mutually communicated replacement subcavities. The temperature sensing member may be mounted on the seat body 1110 of any forced oxidation portion 1100 in the same forced oxidation subsystem 1000, and the temperature sensing member is in communication with the replacement subcavity. Generally, in different forced oxidation test systems 1000, one replacement sensing member may be configured therein respectively, or the replacement sensing member 1170 required to be arranged in the forced oxidation test system 1000 may be selected as required, such as a pressure sensing member.

Optionally, the replacement sensing member 1170 may be selected as a pressure sensing member. In the same forced oxidation test system 1000, the pressure sensing member is configured to acquire the pressures in the plurality of mutually communicated replacement subcavities. The pressure sensing member may be mounted on the seat body 1110 of any forced oxidation portion 1100 in the same forced oxidation subsystem 1000, and the pressure sensing member is in communication with the replacement subcavity. Generally, in different forced oxidation test systems 1000, one pressure sensing member may be configured therein respectively, or the replacement sensing member 1170 required to be arranged in the forced oxidation test system 1000 may be selected as required, such as a temperature sensing member.

Optionally, the replacement sensing member 1170 may be selected as a temperature sensing member and a pressure sensing member. In the same forced oxidation test system 1000, the pressure sensing member and the pressure sensing member are configured to acquire the temperatures and the pressures in the plurality of mutually communicated replacement subcavities. The temperature sensing member and the pressure sensing member may be respectively mounted on the seats 1110 of any two forced oxidation portions 1100 in the same forced oxidation subsystem 1000, and the temperature sensing member and the pressure sensing member are in communication with the replacement subcavity.

It should to be noted that the replacement sensing member 1170 may be any suitable sensing member as required, such as a humidity sensing member, which is not limited to the temperature sensing member and the pressure sensing member.

The sealing assembly 1130 will be described in details as follows. The sealing assembly 1130 includes: a sealing member 1131, a sealing intake joint 1132, and a sealing inflation needle 1133. The sealing member 1131 is configured to adjust sealing between the to-be-tested package 5000 and the seat body inner cavity 1120 through a volume change of the sealing member 1131. The sealing intake joint 1132 is mounted on the seat body 1110. A first end of the sealing inflation needle 1133 is in communication with the sealing member 1131, and a second end of the sealing inflation needle 1133 is connected to a first end of the sealing intake joint 1132. A fastening air source is fed into the sealing member 1131 by the sealing intake joint 1132 through the sealing inflation needle. Specifically, the sealing member 1131 is selected as a pressure bladder.

Optionally, the sealing assembly 1130 further includes a first gas supply member. The first gas supply member is connected to a second end of the sealing intake joint 1132.

The first gas supply member may be connected in series with the sealing intake joint 1132 of each forced oxidation portion 1100 in the same forced oxidation subsystem 1000, so as to improve inflation efficiency and synchronization of the sealing member 1131.

In an embodiment of the present disclosure, the system further includes an inflatable sealed space occupying device. When the number of the to-be-tested packages 5000 actually placed in the forced oxidation test system is less than the maximum processing number preset by the forced oxidation test system, the mounting of the sealed space occupying device can prevent damages caused by large deformation of the sealing member 1131 in the case of vacancy, and at the same time isolate the replacement subcavity of the forced oxidation portion 1100 from the outside air.

The gas replacement assembly 1140 will be described in details as follows. The gas replacement assembly 1140 includes a replacement intake joint 1141 and a replacement outlet joint 1142. The replacement intake joint 1141 is arranged on a first side of the seat body 1110, and the replacement intake joint 1141 is in communication with the replacement subcavity. The replacement gas is fed into the replacement subcavity by the replacement intake joint 1141. The replacement outlet joint 1142 is arranged on a second side of the seat body 1110 opposite to the first side, and the replacement outlet joint 1142 is in communication with the replacement subcavity.

Optionally, the gas replacement assembly 1140 further includes a second gas supply member. The second gas supply member is connected to the replacement intake joint 1141. The second gas supply member is configured to feed the replacement gas into the replacement subcavity through the replacement intake joint 1141.

In an embodiment of the present disclosure, the system further includes a temperature regulating portion 1150. The temperature regulating portion 1150 is mounted between the second gas supply member and the replacement intake joint 1141, and the temperature regulating portion 1150 is configured to regulate a temperature of the replacement gas entering the inner cavity of the forced oxidation portion 1100.

Further, the temperature regulating portion 1150 includes: a heater 1151, an intake coil 1152, a dryer 1153, and a temperature sensor. The heater 1151 is mounted on a coil bracket 1154. The intake coil 1152 is spirally mounted on the heater 1151. A first end of the intake coil 1152 is connected to the second gas supply member, and a second end of the intake coil 1152 is connected to the replacement intake joint 1141. The dryer 1153 is mounted at one end of the intake coil 1152 adjacent to the second end of the intake coil 1152, and the temperature sensor is connected to the intake coil 1152. The temperature of the gas in the intake coil 1152 can be regulated by regulating output power and an intake flow rate of the heater 1151. The heater 1151 may be selected as a PTC heater, which helps to reduce heat dissipation pressure inside an instrument and can control the temperature more accurately.

In an embodiment of the present disclosure, the system further includes a pressure regulating portion 1160. The pressure regulating portion 1160 is configured to regulate the pressure of the replacement gas entering the inner cavity of the forced oxidation portion 1100.

Further, the pressure regulating portion 1160 includes an intake regulating valve 1161 and an exhaust regulating valve 1162. The intake regulating valve 1161 is connected to the replacement intake joint 1141 through an air pipe. The exhaust regulating valve 1162 is connected to the replacement outlet joint 1142 through the air pipe. The pressure in the inner cavity of the forced oxidation portion 1100 is regulated by regulating opening degrees of the intake regulating valve 1161 and the exhaust regulating valve 1162.

It should be understood that an inflation regulating valve may also be arranged in the sealing assembly 1130. Specifically, the inflation regulating valve is mounted between the first gas element and the sealing inflation needle 1133, and the pressure of the gas in the sealing member 1131 can be regulated by regulating an opening degree of the inflation regulating valve.

Optionally, the air pipe at a rear end of the exhaust regulating valve 1162 is provided with a bypass pipeline. A pipe diameter of the bypass pipeline controlled by the exhaust regulating valve 1162 should be within ½ of that of a main pipeline, so as to reduce a single exhaust amount, thereby more accurately regulating the pressure of the inner cavity of the forced oxidation portion.

In an embodiment of the present disclosure, the temperature regulating portion 1150 and the pressure regulating portion 1160 may be arranged at the same time.

In an embodiment of the present disclosure, the first cabinet 2000 is provided with a positioning groove, and the to-be-tested package 5000 is placed in the positioning groove. The positioning groove may be of a stepped or multi-layered structure, so as to adapt the to-be-tested packages 5000 with different specifications, which optimizes versatility of the forced oxidation test system.

In an embodiment of the present disclosure, a ventilation hole is provided at the bottom of the positioning groove. A cooling device arranged in the first cabinet 2000 can reduce the temperature of the air in the first cabinet 2000 to a preset temperature when operating. At the same time, a cooling circulation air pump operates to cool the air in the positioning groove through the ventilation hole, such that a part of a sample bottle located in the positioning groove can be kept at a lower temperature.

In an embodiment of the present disclosure, the connecting device 4000 includes: a drive motor, a synchronous transmission shaft, and a telescopic rod. The drive motor is mounted in the first cabinet 2000. The synchronous transmission shaft is connected to an output end of the drive motor. A first end of a fixed section of the telescopic rod is connected to the first cabinet 2000, a second end of the fixed section of the telescopic rod is connected to a first end of a movable section of the telescopic rod, and a second end of the movable section of the telescopic rod is connected to the second cabinet 3000. The synchronous transmission shaft is connected to the second end of the fixed section of the telescopic rod or the first end of the movable section of the telescopic rod. The drive motor drives the synchronous transmission shaft and the movable section of the telescopic rod to move up and down, such that the second cabinet 3000 reaches a preset height.

A method of controlling the forced oxidation test system provided in an embodiment of the present disclosure mainly includes: a stroke memory step, a setting-out step, a test execution step, an unloading step, and a system reset step.

When the stroke memory step is performed, the second cabinet 3000 may be manually raised and lowered, and a vacancy stroke and a test stroke may be executed according to a stroke memory instruction. The vacancy stroke is an action stroke of the connecting device 4000 when the forced oxidation test system is reset, and the test stroke is an action stroke of the connection device 4000 when the test execution step is performed. Specifically, for the stroke memory instruction, an instruction button corresponding to the stroke memory instruction may be selected on a control panel configured on the second cabinet 3000. The control panel may be a touch panel, and the instruction button corresponding to the stroke memory instruction is directly clicked and selected on the touch panel.

In the setting-out step, the to-be-tested packages 5000 (such as bottled packages or canned packages) are generally manually placed in the first cabinet 2000. It should to be noted that the to-be-tested packages 5000 are placed in the positioning groove to ensure stable placement of the to-be-tested packages 5000.

The test execution step sequentially includes: an inflatable sealing substep, a gas replacement substep, and a test execution substep.

The inflatable sealing substep is performed first, in which the first gas supply member inflates the sealing member 1131, such that the to-be-tested package 5000 is in a sealed connection to the seat body inner cavity 1120, and a replacement subcavity is formed in the seat body inner cavity 1120. For example, the inflation pressure of the first gas supply member may be set to 0.09 MPa.

Secondly, the gas replacement substep is performed, in which a replacement gas is fed into the replacement subcavity to replace the gas in the replacement subcavity. In one embodiment, parallel groups may be replaced at the same time or replaced in sequence. The replacement flow rate may be set to 10 ml/min, or set according to different sealing assembly models.

The test execution substep is performed, in which a state of the replacement gas in the replacement subcavity is maintained. Specifically, the replacement gas is kept at a constant temperature and constant pressure until a permeation degree of the to-be-tested package 5000 reaches a requirement of a shelf life simulation test. The constant-temperature state is regulated by a heating device mounted in the second cabinet 3000 and a cooling device mounted in the first cabinet 2000. The constant-pressure state of the replacement subcavity is ensured by adjusting an opening degree of an air valve. It should to be noted that, according to a test condition, the parallel groups may be set to the same pressure or be grouped and set to different pressure to complete different test condition requirements.

After the test execution substep, the unloading step is performed. The unloading step sequentially includes: a pressure unloading substep, a temperature unloading substep, and a reset substep.

When the pressure unloading substep is performed, the replacement subcavity is depressurized by regulating the intake regulating valve 1161 and the exhaust regulating valve.

When the temperature unloading substep is performed, gas purging is performed in the replacement subcavity, the operation stops when the temperature reaches a preset value. For example, a purging flow rate may be set to 10 ml/min, or set according to different sealing assembly models.

When the reset substep is performed, the connecting device 4000 is reset to a vacancy stroke state. So far, a single process for controlling the forced oxidation test system has been completed.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A forced oxidation test system, comprising: a plurality of forced oxidation subsystems, inner cavities of adjacent forced oxidation subsystems being arranged in parallel, the plurality of forced oxidation subsystems comprising a plurality of forced oxidation portions, inner cavities of adjacent forced oxidation portions-being arranged in series; a first cabinet, a to-be-tested package being placed on the first cabinet; and a second cabinet connected to the first cabinet through a connecting device, the plurality of forced oxidation subsystems being mounted on the second cabinet, and the forced oxidation portion being arranged opposite to the to-be-tested package, wherein the second cabinet is configured to move along an axis of the connecting devices in a direction adjacent to the to-be-tested package until the inner cavity of the forced oxidation portion is sealedly-mounted on the to-be-tested package, such that a replacement gas in the inner cavity of the forced oxidation portions is permeated into the to-be-tested package, and wherein the connecting device comprises: a drive motor mounted in the first cabinet; a synchronous transmission shaft connected to an output end of the drive motor; and a telescopic rod, a first end of a fixed section of the telescopic rod being connected to the first cabinet, a second end of the fixed section of the telescopic rod being connected to a first end of a movable section of the telescopic rod, and a second end of the movable section of the telescopic rod being connected to the second cabinet, the synchronous transmission shaft being connected to the second end of the fixed section of the telescopic rod or the first end of the movable section of the telescopic rod.

2. The forced oxidation test system according to claim 1, wherein each of the forced oxidation portions (1100) comprises:

a seat body (1110) provided with a seat body inner cavity (1120) along a first direction, the seat body inner cavity (1120) being provided with a mounting port, wherein the first direction is configured as a mounting direction of the to-be-tested package (5000);

a sealing assembly (1130) arranged in the seat body inner cavity (1120) and located at an end of the seat body inner cavity (1120) adjacent to the mounting port, the sealing assembly (1130) being sleeved between the to-be-tested package (5000) and the seat body inner cavity (1120), a replacement subcavity being formed in the seat body inner cavity (1120); and a gas replacement assembly (1140) in communication with the replacement subcavity, the gas replacement assembly (1140) being configured to feed the replacement gas into the replacement subcavity through a ventilation joint.

3. The forced oxidation test system according to claim 2, wherein each of the forced oxidation portions (1100) further comprises:

a replacement sensing member (1170) configured to acquire temperatures and/or pressures in the plurality of mutually communicated replacement subcavities in the same forced oxidation subsystem (1000), the replacement sensing member (1170) being mounted on the seat body (1110) of any one and/or two of the forced oxidation portions (1100) in the same forced oxidation subsystem (1000), and the replacement sensing member (1170) being in communication with the replacement subcavity.

4. The forced oxidation test system according to claim 2, wherein the sealing assembly (1130) comprises:

a sealing member (1131) configured to adjust sealing between the to-be-tested package (5000) and the seat body inner cavity (1120) through a volume change of the sealing member (1131);

a sealing intake joint (1132) connected to the seat body (1110); and a sealing inflation needle (1133), a first end of the sealing inflation needle (1133) being in communication with the sealing member (1131), and a second end of the sealing inflation needle (1133) being connected to a first end of the sealing intake joint (1132), a fastening air source being fed into the sealing member (1131) by the sealing intake joint (1132) through the sealing inflation needle (1133).

5. The forced oxidation test system according to claim 2, wherein the gas replacement assembly (1140) comprises:

a replacement intake joint (1141) arranged on a first side of the seat body (1110), the replacement intake joint (1141) being in communication with the replacement subcavity, wherein the replacement gas is fed into the replacement subcavity by the replacement intake joint (1141); and a replacement outlet joint (1142) arranged on a second side of the seat body (1110) opposite to the first side, and the replacement outlet joint (1142) being in communication with the replacement subcavity.

6. The forced oxidation test system according to claim 5, wherein each of the forced oxidation subsystems (1000) further comprises:

a temperature regulating portion (1150) mounted at an input end of the replacement intake joint (1141), the temperature regulating portion (1150) being configured to regulate a temperature of the replacement gas entering the inner cavity of the forced oxidation portion (1100); the temperature regulating portion (1150) comprising:

a heater (1151) mounted on a coil bracket (1154);

an intake coil (1152), the intake coil (1152) being spirally mounted on the heater (1151), a first end of the intake coil (1152) being connected to the input end of the replacement intake joint (1141), the replacement gas being fed from the other end of the intake coil (1152);

a dryer (1153) mounted at an end of the intake coil (1152) adjacent to a second end of the intake coil (1152); and a temperature sensor connected to the intake coil (1152).

7. The forced oxidation test system according to claim 5, wherein each of the forced oxidation subsystems (1000) further comprises:

a pressure regulating portion (1160) configured to regulate a pressure of the replacement gas entering the inner cavity of the forced oxidation portion (1100), the pressure adjustment portion (1160) comprising:

an intake regulating valve (1161) connected to the replacement intake joint (1141) through an air pipe; and an exhaust regulating valve (1162) connected to the replacement outlet joint (1142) through the air pipe.

8. The forced oxidation test system according to claim 1, wherein the first cabinet (2000) is provided with a positioning groove, and the to-be-tested package (5000) is placed in the positioning groove.

9. The forced oxidation test system according to claim 8, wherein a ventilation hole is provided at a bottom of the positioning groove.

* * * * *